United States Patent [19]
Masaru

[11] Patent Number: 5,235,568
[45] Date of Patent: Aug. 10, 1993

[54] SYSTEM AND THE CONTROL METHOD THEREOF FOR COMPACT DISK CHANGER PLAYER AND RADIO RECEIVER

[75] Inventor: Noguchi Masaru, Hachioji, Japan

[73] Assignee: SamSung Electronics Co., Ltd., Suwon, Rep. of Korea

[21] Appl. No.: 701,758

[22] Filed: May 17, 1991

[30] Foreign Application Priority Data

Sep. 8, 1990 [KR] Rep. of Korea .................... 90-14188

[51] Int. Cl.$^5$ ......................... H04B 1/20; H05K 11/02
[52] U.S. Cl. ........................................... 369/2; 369/6; 455/344; 455/345
[58] Field of Search ...................... 369/1, 2, 6, 33, 34, 369/32; 455/345, 344, 346

[56] References Cited

U.S. PATENT DOCUMENTS

| | | | |
|---|---|---|---|
| 4,495,607 | 1/1988 | Nishida | 369/6 |
| 4,542,490 | 9/1985 | Shimizu et al. | 369/6 |

FOREIGN PATENT DOCUMENTS

| | | | |
|---|---|---|---|
| 0057892 | 4/1987 | European Pat. Off. | 369/6 |
| 3537078 | 4/1987 | Fed. Rep. of Germany | 455/345 |
| 3726784 | 2/1989 | Fed. Rep. of Germany | 455/345 |

Primary Examiner—Eugene R. LaRoche
Assistant Examiner—Tan Nguyen
Attorney, Agent, or Firm—Robert E. Bushnell

[57] ABSTRACT

A combined system for commonly controlling a compact disk changer player and a radio receiver has a plurality of memory/call switches for selectively operating the compact disk changer player and the radio receiver under the control of a microcomputer; and a radio/compact disk changeover switch, for selectively playing back a user's desired disk and track. In the control method of the combined system for commonly controlling the compact disk changer player and the radio receiver, the first and second inputs of the memory/call switches coincide with a ten's place number corresponding to a disk number and a one's place number corresponding to a track number, respectively and a radio frequency changeover data is generated to operate the radio receiver when the radio/compact disk changeover switch is switched to the radio receiver, while a disk number changeover data and a track number changeover data are generated to operate the compact disk changer player when the radio/compact disk changeover switch is switched to the compact disk.

18 Claims, 2 Drawing Sheets

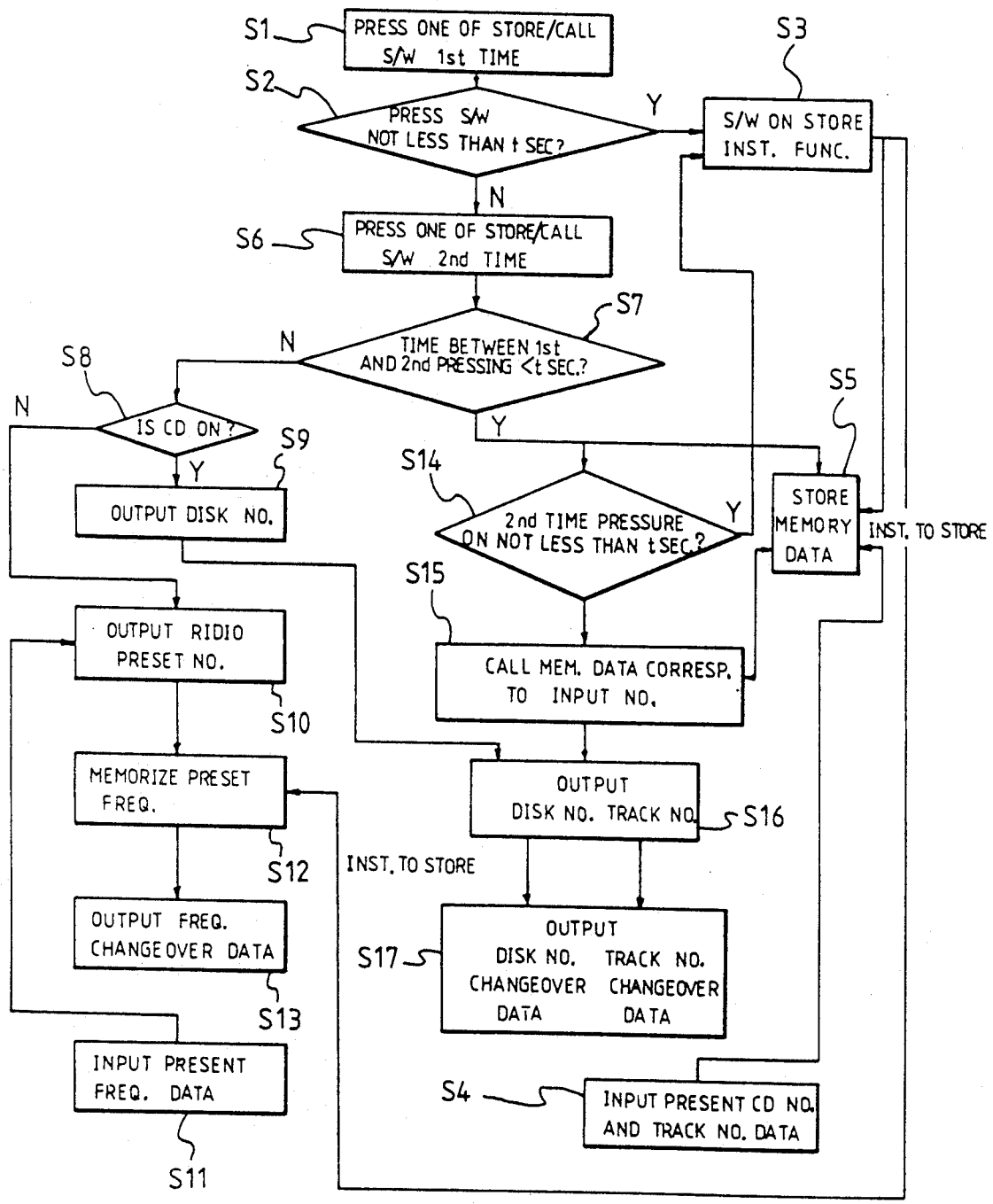

SYSTEM AND THE CONTROL METHOD THEREOF FOR COMPACT DISK CHANGER PLAYER AND RADIO RECEIVER

BACKGROUND OF THE INVENTION

1. Field of the Invention

The present invention relates to a control apparatus and the control method thereof common to and for a compact disk changer player and a radio receiver, and more particularly to a control apparatus and the method for controlling a compact disk changer player and a radio receiver which are installed in an automobile, by using a controller having a memory/call switch and a compact disk/radio changeover switch in common for selecting the compact disk in the compact disk changer player or the channel of the radio broadcast in accordance with the changeover positions of the memory/call switch and the compact disk/radio changeover switch.

2. Description of the Prior Art

Generally, a radio cassette tape player for automobiles has an electronic tuning preset type memory/call switch. Accordingly, before receiving the radio frequencies, n channel frequencies are set to correspond to n switches, respectively. Then, the user's desired channel is selected by activating one of the switches. However, when the cassette tape is loaded into the cassette deck or when the cassette tape is played back, the radio/cassette tape player changeover switch is automatically changed over so that the radio broadcast can not be received. Also, when a compact disk changer player is coupled to the car audio system in place of the cassette tape player, the memory/call switches for the compact disk changer player are installed in an automobile's audio system separately, with the memory/call switches for the radio receiver so as to enable access to the disk number and track number in the compact disk magazine automatically chosen by the compact disk changer player.

Owing to this and the fact that, the entire volume of the automobiles audio system is increased, causing an added burden in installing the system in a confined space such as in an automobile, the resultant production cost of the entire audio system is increased.

SUMMARY OF THE INVENTION

It is an object of this invention, for the purpose of solving the above mentioned problems, to provide a control apparatus and the method thereof for common control of a compact disk changer player and a radio receiver, in which the compact disk changer player is combined with the radio receiver and n memory/call switches capable of memorizing or calling n channel frequencies for use in an automobile, and a microcomputer to instruct operation of the radio receiver or the compact disk changer player in accordance with the output signals of each of the memory/call switches and a radio/compact disk changer over switch, thereby selectively operating the compact disk changer player according to the desired disk number and track number as well as the radio receiver according to the desired broadcasting channel frequency.

To accomplish the above object, there is provided a combined system for commonly controlling a compact disk changer player and a radio receiver comprising:

a compact disk changer player having a compact disk magazine which contains n' compact disks and for automatically selecting one of the n' compacts disks;

an electronic type tuning type radio receiver;

a controller having n memory/call switches in which each of the channel frequencies is memorized in an electronic tuning preset type device and where a user's desired channel frequency is selected, and a radio/compact disk changeover switch for selecting one of either the radio receiver of the compact disk changer player; and a microcomputer for receiving memory/call information and radio/compact disk changeover information outputted from said controller, so as to control said compact disk changer player and said electronic tuning type radio receiver.

Also, provided is a combined system control method for a compact disk changer player and a radio receiver having an memory/call switches and a radio/compact disk changeover switch adapted to the compact disk changer player and the radio receiver in common, so as to enable the compact disk changer player to select one of the compacts disks contained in a compact disk magazine within the compact disk changer player and to playback the selected compact disk, comprising the steps of:

determining that one of n memory/call switches is pressed for the first time and the first pressing time is held for not less than t seconds;

determining that one of said n memory/call switches is pressed for the second time and the second pressing is performed with t seconds from the first pressing time;

storing data corresponding to a combination of a disk number and a track number into a memory device, when said first and second pressing time is held for not less than t seconds;

determining that a position of said compact disk/radio changeover switch is in an "ON" position of said compact disk changer player when said second pressing of said n memory/call switches is performed after t seconds from said first pressing time, and reading out data corresponding to the disk number and the track number, so as to output disk number changeover data and track number changeover data; and outputting a preset number for said radio receiver when the position of said compact disk/radio changeover switch is in an "OFF" position of said compact disk changer player, and then reading out frequency changeover data from a preset frequency memory, so as to output the read-out frequency changeover data to said radio receiver.

BRIEF DESCRIPTION OF THE DRAWINGS

FIG. 2 is a flow chart showing a control method for controlling a compact disk changer player and a radio receiver in common according to this invention.

DETAILED DESCRIPTION OF THE INVENTION

Figure 1:
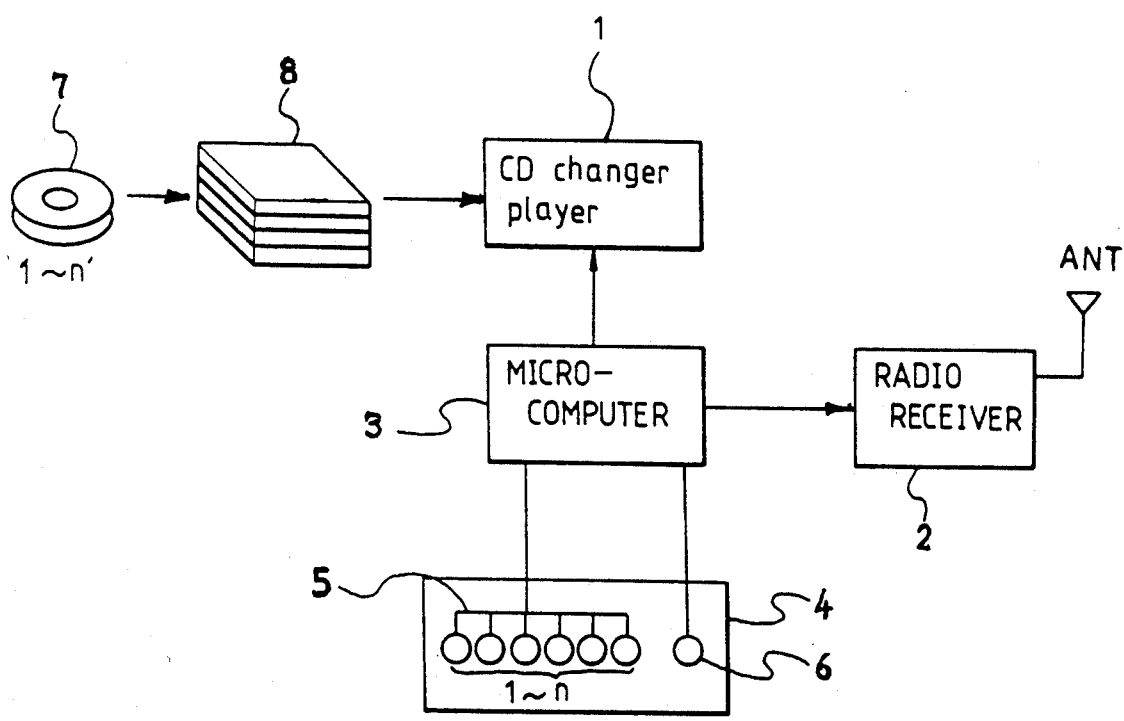
FIG. 1 is a diagram schematically showing a combine system capable of controlling a compact disk changer player and a radio receiver in common according to this invention.

The present invention will be understood more fully from the detailed description given hereinafter and from the accompanying drawings of the preferred embodiment.

FIG. 1 is a diagram schematically showing a combined control system for a compact disk changer player and a radio receiver according to this invention.

Referring to FIG. 1, a compact disk changer player 1 includes a compact disk magazine 8 for receiving n' compact disks 7", and replace selectively playing the user's desired track in the user's desired disk in accordance with the data information corresponding to the disk number and the track number information supplied from a microcomputer 3. Also, a controller 4 includes n memory/call switches 5 for generating information corresponding to a combination of the disk number and the track number of the compact disk 7 under the control of the microcomputer 3, and for memorizing each of the channel frequencies input through an antenna ANT with an electronic type tuning preset device so as to select the user's desired channel, and a radio/compact disk changeover switch 6 for selecting one of either the radio receiver 2 or the compact disk changer player 1. The microcomputer 3 instructs to control the compact disk changer player 1 and the electronic tuning type radio receiver 2 in accordance with the information of the memory/call data and the changeover switch mode corresponding to the disk and track or the channel frequency supplied from the controller 4.

The controller 4 decides whether the compact disk changer player 1 or radio receiver 2 is selected for use in accordance with the compact disk "ON" signal and the position of the radio/compact disk changeover switch 6, and accordingly, the electronic type tuning preset frequency memory/call switches 5 for the radio receiver operate to allow selection of the desired channel frequency. Also, the compact disk changer player 1 automatically plays back one of the disks 1 to n' that are contained in the compact disk magazine 8. At this time, the microcomputer 3 has control of the signaling. The control operation and the method of the control apparatus according to this invention will be described below in detail with reference to FIG. 2.

FIG. 2 is a flowchart showing a compact disk changer player and radio receiver common control method.

Referring to FIGS. 1 and 2, one of n memory/call switches 5 is pressed for the first time in step S1, and then the microcomputer 3 judges whether the first pressed time is less than predetermined time t seconds in step S2. Usually, t is equal to 2 seconds or is a sufficient time required to distinguish the pressing from one of the switch buttons. Next, in above described step S2, if the pressing time is not less than t seconds, the memory function is turned on in step S3 and the current data corresponding to the disk and track numbers are put into the memory in steps S5 and S12. But, in above described step 2, if the pressing time is less than t seconds, the operation of step S1 is repeated in step 6. Next, it is determined in step S7 whether the second pressing occurs within t seconds from the first pressing step 1. At this time, if the second press does not occur within t seconds from the first pressed time in step S7, and the compact disk is "ON" in step S8, the disk number is outputted in step S9, while if the compact disk isn't "ON" in step S8, the radio preset number is outputted in step S10. In other words, if the second press signal doesn't occur within t seconds, the number is judged as a first digit number, and in the case of the radio, it becomes a preset sequential channel frequency number and in the case of the compact disk, it becomes a sequential disk number of the compact disk. Next, when the radio preset number is outputted in step S10, the microcomputer 3 receives the current frequency data in step S11, and calls in step S12 the frequency memory data stored in the preset frequency memory in accordance with the above described memory function of step S3, thereby outputting the frequency selection data in step S13.

However, in step S7, when the second pressed signal occurs within a predetermined time of t seconds, new data is stored into the memory in step S5. In the next step S14, when the second press time is more than t seconds, the microcomputer 3 initiates a new on condition in step S3, and sends new memory command signals to the memory in steps S5 and S12. In step 14, if it is not "ON" for not less than t seconds, the memory data corresponding to the number input from the memory is called in step S15, and the disk number and track number are output to the compact disk player output circuit in step S16. Accordingly, the disk number changeover data and the track number changeover data are output in step S17. At this time, in step 16, when the compact disk is "ON" in step S8 and the disk number is to be output in step S9, the corresponding disk number changeover data are is output in step S17.

In step S7, when the second press of the memory/call switch is within the predetermined time of t seconds from the first press, the first press input is the number of the ten's place corresponding to the number of compact disks from 1 to n' and the second press input is the number of the one's place corresponding to the number of compact disks from 1 to n'. Here, the second press input corresponds to the track number. Therefore, this invention is to provide a method for controlling n' disks and tracks of a compact disk changer player 1 by using n memory/call switches 5 for a radio receiver 2.

For example, when n' is 6, the combination of the disk and the track will be as follows:

| 11 | 12 | 13 | 14 | 15 | 16 |
| 21 | 22 | 23 | 24 | 25 | 26 |
| 31 | 32 | 33 | 34 | 35 | 36 |
| 41 | 42 | 43 | 44 | 45 | 46 |
| 51 | 52 | 53 | 54 | 55 | 56 |
| 61 | 62 | 63 | 64 | 65 | 66 |

Thus, total 36 different combinations are obtained. Each of the combinations is used in the memory/call operation with sequential numbering as a combinational number of the selected disk number and track number in step S15. Here, the number n of memory/call switches 5 and the number n' of disks are in the relationship of $n \geq n'$ and the relationship is most preferable when $n = n'$.

On the other hand, as in step S3 of FIG. 2, the memory function is "ON" when the first press time in step S2 or the second press time in step S14 of the memory/call switch 5 is not less than t seconds, but this can also be performed through another method different from this by inputting a separate memory command signal.

As described above, the combined system and the control method for a compact disk changer player, and radio receiver 2 according to this invention utilizes n memory/call switches in common for radio receiver 2 and operates the compact disk changer player 1 under the control of the microcomputer 3 in which the compact disk magazine contains n' compact disks. Therefore, the compact disk corresponding to the desired disk and the track number is automatically selected and activated.

Another effect is that since it is not easy for the users to remember many combinations of numbers and associated them directly, the memory device usually can conveniently store and associate numerous disk and track number data.

So in this invention, by making $n=n'$, its practicality becomes clear. A most realistic and simple example is when $n=6$. In this case, for convenience, it is assumed that the disk number is the same as the 10's position number and the track number is that of the 1's position and is the only number that must be memorized. Also, from the aspect of practicality, since it would be extremely difficult to use all of the capacity of the disks, by manufacturing the disk number the same as the 10's position number sufficient disk capacity can be selected with this invention, effective used by the user comes from making the disk number that of the 10's position and the track number that of the 1's position. Moreover, by the factory making the disk number to be the same as the 10's position, production cost is reduced.

What is claimed is:

1. A system for commonly controlling a compact disc changer player and an electronic tuning radio receiver, comprising:
   a compact disc changer player having a magazine for storing a plurality of compact discs, and for making an automatic selection from among said plurality of compact discs;
   a controller having a plurality of memory/call switches respectively corresponding to a plurality of channel frequencies memorized in the electronic type tuning radio receiver, and a system changeover switch for selecting one of the electronic tuning radio receiver and the compact disc changer player; and
   a processor for receiving a memory/call signal and a changeover signal provided from said controller, so as to enable said plurality of memory/call switches to control said compact disc changer player and said electronic tuning radio receiver to make selections among said plurality of channel frequencies and to make said automatic selection.

2. The system as claimed in claim 1, wherein said plurality of memory/call switches is not less in number than said plurality of compact disc.

3. The system as claimed in claim 1, wherein said plurality of memory/call switches has six memory/call switches.

4. The system as claimed in claim 1, further comprised of said processor controlling said compact disc changer player and said electronic tuning radio receiver by:
   memorizing and calling a disc number by operating during a first switching time selected ones of the plurality of memory/call switches that are commonly adaptable to said compact disc changer player and said radio receiver; and
   memorizing and calling a combination of a number of selected compact disc contained in a magazine of said compact disc changer player and a number of tracks arranged in said selected compact discs by operating during a second switching time occurring subsequent to said firs switching time said plurality of memory/call switches.

5. The system as claimed in claim 1, further comprised of said processor controlling said compact disc changer player and said electronic tuning radio receiver by:
   detecting whether a selected one of said plurality of memory/call switches is pressed for a first pressing time;
   writing a first instructional function corresponding to a selected disc and track number onto a compact disc memory, and a second instructional function corresponding to a radio preset frequency onto a radio frequency memory if said first pressing time is not less than a first time period;
   detecting whether said selected one of said plurality of memory/call switches is pressed for a second pressing time subsequent to said first pressing time;
   determining whether a timing interval between said first pressing time and occurrence of said second pressing time is less than a second time period;
   if said system changeover switch is in an ON state providing a disc number to be played back by said compact disc changer player when said timing interval between said first pressing time and said second pressing time is not less than said second time period;
   generating said radio preset number for said electronic tuning radio receiver when said system changeover switch is in an OFF state to read out a changeover frequency from a preset frequency memory and thereby provide a frequency changeover signal to said electronic tuning radio receiver corresponding to said changeover frequency;
   storing data corresponding to the disc number and a track number into a compact disc memory when said timing interval between said first pressing time and said second pressing time is less than said second time period;
   determining whether a timing interval of said second pressing time is less than a third time period;
   writing said first instructional function corresponding to said selected disc and track numbers onto said first memory, and said second instructional function corresponding to a radio preset frequency onto a second memory if said second pressing time is not less than a third time period; and
   recalling data corresponding to the disc number and the track number to provide a disc number changeover signal and a track number changeover signal to said compact disc changer player corresponding respectively to said disc number and said track number.

6. A combined CD/radio system for a radio receiver adaptable for an automobile, a plurality of electronic preset memory/call switches, and a compact disc changer player having a compact disc magazine containing a plurality of compact discs and means for making a selection of a user's designated disc from among said plurality of compact discs and track to be played back, said system comprising:
   controller means having said plurality of memory/call switches for commonly controlling said radio receiver and said compact disc changer player, and a system changeover switch coupled to said plurality of memory/call switches to generate control signals by operating each of said plurality of memory/call switches; and
   processor means coupled to receive said control signals, for enabling said plurality of memory/call switches to control said radio receiver and said compact disc changer player to make selections among a plurality of channel frequencies receivable by said radio receiver and to make said selection of a user's designated disc by:

determining whether a selected one of said plurality of memory/call switches is pressed for a first pressing time;

determining whether said selected one of said plurality of memory/call switches is pressed for a second pressing time subsequent to said first pressing time;

storing data corresponding to a combination of a disc number and a track number into a memory when said first and second pressing times are not less than a first predetermined time;

determining whether a position of said system changeover switch is in an ON state for indicating the disc number to be played back in said compact disc changer player when a timing interval between said first pressing time and said second pressing time of said selected one of said plurality of memory/call switches is greater than a second predetermined time, and reading data corresponding to the disc number and the track number to provide a disc changeover signal and a track number changeover signal to said compact disc changer player; and generating a radio preset number for said radio receiver when said system changeover switch is in an OFF state, to enable tracking of a changeover frequency from a preset frequency memory to provide a frequency changeover signal to said radio receiver.

7. The system as claimed in claim 6 further comprised of said processor means controlling said compact disc changer player and said radio receiver by:

determining whether a selected one of said plurality of memory/call switches is pressed for a first pressing time;

determining whether said selected one of said plurality of memory/call switches is pressed for a second pressing time subsequent to said first pressing time;

storing data correspond to a combination of a disk number and a track number into a memory device, when said first and second pressing times are greater than or equal to a first time period;

determining whether said system changeover switch is in an "ON" state for indicating the disc number to be played back by said compact disc changer player when a timing interval between said first pressing time and said second pressing time of said selected one of said plurality of memory/call switches is greater than a second time period, and reading out data correspond to the disk number and the track number so as to provide a disk number changeover signal and a track number changeover signal; and generating a radio preset number for said electronic tuning radio receiver when said system changeover switch is an "OFF" state to enable tracking of a changeover frequency from a preset frequency memory so as to provide a frequency changeover signal to said electronic tuning radio receiver.

8. A method for controlling a compact disc changer player and a radio receiver having a plurality of memory/call switches and a system changeover switch adaptable for the compact disc changer player and the radio receiver, to enable the compact disc changer player to select one of a plurality of compact discs contained in a compact disc magazine within the compact disc changer player, and to playback the selected compact disc, the method comprising the steps of:

determining whether a selected one of said plurality of memory/call switches is pressed for a first pressing time;

determining whether said selected one of said plurality of memory/call switches is pressed for a second pressing time occurring subsequent to said first pressing time;

storing data corresponding to a combination of a disc number and a track number into a memory device, when both said first pressing time and said second pressing time are not less than a first predetermined time;

if said system changeover switch is in an ON state indicative of said compact disc changer player when a time interval of said second pressing time of said selected one of said plurality of memory/call switches is greater by a second predetermined time from said first pressing time, reading out data corresponding to the disc and the track number, to provide a disc changeover signal and a track number changeover signal to said compact disc changer player in respective dependence upon said disc number and said track number; and generating a preset number for said radio receiver when said system changeover switch is in an OFF state, and reading out a changeover frequency from a preset frequency memory, to provide a frequency changeover signal to said radio receiver in dependence upon said changeover frequency.

9. The control method as claimed in claim 8, further comprised of setting said first pressing time of said selected one of said plurality of memory/call switches to coincide with a ten's place number corresponding to said disc number, and said second pressing time to coincide with a unit's place number corresponding to said track number, when said selected one of said plurality of memory/call switches is pressed for a period that is one of greater than and equal to said first predetermined time.

10. A method for controlling a radio receiver having a plurality of electronic preset type tuning memory/call switches and a compact disc changer player for automatically selecting and playing back a selected one of a plurality of compact discs, comprising the steps of:

memorizing and calling a disk number by operating said plurality of memory/call switches commonly adaptable to said compact disc changer player and said radio receiver for a first switching time; and memorizing and calling a combination of a number of selected compact discs contained in a magazine and a number of tracks arranged in said selected compact discs by operating said plurality of memory/call switches for a second switching time subsequent to said first switching time.

11. A system for commonly controlling a compact disc changer player and an electronic tuning radio receiver, comprising:

a compact disc changer player having a magazine for storing a plurality of compact discs, and for making an automatic selection from among said plurality of compact discs;

a controller having a plurality of memory/call switches respectively corresponding to a plurality of channel frequencies memorized in the electronic tuning radio receiver, and a system changeover switch for selecting one of the electronic tuning radio receiver and the compact disc changer player; and processing means for receiving a memory/call signal and a changeover signal provided from said controller, to enable said plurality of memory/call switches to control said compact disc changer player and said electronic tuning radio receiver to make selections among said plurality of channel frequencies and to make said automatic selection by:

determining whether a selected one of said plurality of memory/call switches is pressed for a first pressing time;

determining whether said selected one of said plurality of memory/call switches is pressed for a second pressing time subsequent to said first pressing time;

storing data correspond to a combination of a disc number and a track number into a memory when said first and second pressing times are one of greater than and equal to a first predetermined time;

determining whether a position of said system changeover switch is in an ON state for indicating the disc number to be played back in said compact disc changer player when a timing interval between said first pressing time and said second pressing time of said selected one of said plurality of memory/call switches is greater than a second predetermined time, and reading out data corresponding to the disc number and the track number to provide a disc number changeover signal and a track number changeover signal to said compact disc changer player in respective dependence upon the disc number and the track number; and generating a radio preset number for said radio receiver when said system changeover switch is an OFF state to enable tracking of a changeover frequency from a preset frequency memory to provide a frequency changeover signal to said radio receiver in response to said changeover frequency.

12. A combined CD/radio system for a radio receiver comprising a plurality of electronic preset memory/call switches, and a compact disc changer player comprising a compact disc magazine containing a plurality of compact discs and playing back a user's selection of a disc, said system comprising:

controller means having said plurality of memory/call switches for commonly controlling said radio receiver and said compact disc changer player, and a system changeover switch coupled to said plurality of memory/call switches to generate control signals by operating each of said plurality of memory/call switches; and processor means coupled to receive said control signals, for enabling the plurality of memory/call switches to control said radio receiver and said compact disc changer player to make selections from among said plurality of a channel frequencies and to make said user's selection by:

detecting whether a selected one of said plurality of memory/call switches is pressed for a first pressing time;

writing a first instructional function corresponding to a selected disc and track numbers onto a compact disc memory, and a second instructional function corresponding to a radio preset frequency onto a radio frequency memory if said first pressing time is not less than a first time period;

detecting whether said selected one of said plurality of memory/call switches is pressed for a second pressing time subsequent to said first pressing time;

determining whether a timing interval between said first pressing time and said second pressing time is less than second time period;

if said system changeover switch is in an ON state providing a disc number to be played back by said compact disc changer player when said timing interval between said first pressing time and said second pressing time is not less than said second time period;

generating said radio preset number for said radio receiver when said system changeover switch is in an OFF state to read out a changeover frequency from a preset frequency memory and providing a frequency changeover signal to said radio receiver;

storing data correspond to the disc number and a track number into a compact disc memory when said timing interval between said first pressing time and said second pressing time is less than said second time period;

determining whether a timing interval of said second pressing time is less than a third time period;

writing said first instructional function corresponding to said selected disc and track numbers onto said first memory, and said second instructional function corresponding to a radio preset frequency onto a second memory if said second pressing time is not less than a third time period; and recalling data corresponding to the disc number and the track number so as to provide a disc number changeover signal and a track number changeover signal to said compact disc changer player.

13. A method for controlling a combined system of a CD changer player and a radio receiver having n memory/call switches and a radio/CD changeover switch adapted to the CD changer player and the radio receiver in common, so as to enable the CD changer player to select one of the CDs contained in a CD magazine with the CD changer player and to playback the selected CD, comprising the steps of:

determining that any one of n memory/call switches is pressed for a first pressing time and the duration of said first pressing time is more than t seconds;

determining that any one of said n memory/call switches is pressed for a second pressing time and second pressing time is occurs within t seconds from the first pressing time;

storing data corresponding to a combination of a disk number and a track number into a memory device, when said duration of said first pressing time and the duration of said second pressing time are not less than t seconds;

determining that a position of said CD/radio changeover switch is in an "ON" position of said CD changer player when said duration of said second pressing time of said n memory/call switches is more than t seconds from said first pressing time, and reading out data corresponding to the disk number and the track number as disk number changeover data; and outputting a preset number for said radio receiver when the position of said CD/radio changeover switch is in an "OFF" position of said CD change player, and then reading frequency changeover data from a preset frequency memory as to output said frequency changeover data to said radio receiver.

14. A control method as claimed in claim 13, further comprised of setting data corresponding to said first pressing time of said memory/call switches to coincide with the ten's place number corresponding to said disk number, and said setting data corresponding to second pressing time to coincide with the one's place number corresponding to said track number, when said memory/call switches are pressed for not less than t seconds.

15. A system for commonly controlling a recording media changer player and an electronic tuning radio receiver, comprising:
- a recording media changer player having a magazine for holding a plurality of media for storing information and for making a first selection of a selected medium from among said plurality of media and a second selection of selected information stored in said selected medium;
- a controller having a plurality of memory/call switches respectively corresponding to a plurality of channel frequencies memorized in the electronic type tuning radio receiver, and a system changeover switch for selecting one of the electronic tuning radio receiver and the changer player; and
- processing means for receiving a memory/call signal and a changeover signal provided from said controller, so as to enable said plurality of memory/call switch to control said changer player and said electronic tuning radio receiver to make selection memory said plurality of channel frequencies and to make said first selection and said second selection.

16. The system of claim 15, further comprising said plurality of memory/call switches being not less in number than said plurality of the media receivable within the magazine.

17. The system of claim 15, further comprising said plurality of memory/call switches being equal in number to said plurality of media.

18. The system of claim 15, further comprised said processing means comprising of:
- determining whether a selected one of said plurality of memory/call switches is pressed for a first pressing time;
- determining whether said selected one of said plurality of memory/call switches is pressed for a second pressing time subsequent to said first pressing time;
- storing data corresponding to a combination of a first number representing said selected medium and a number representing to said selected information, into a memory when said first and second pressing times are not less than a first predetermined time;
- determining whether a position of said system changeover switches is in a ON state for indicating said first number to be played back in the changer player when a timing interval between said first pressing time and said second pressing time of said selected one of said plurality of memory/call switches is greater than a second predetermined time, and reading data corresponding to said first number and said second number to provide a media changeover signal and a selected information changeover signal to said changer player; and
- generating a radio preset number for said radio receiver when said system changeover switch is an OFF state, to enable tracking of a changeover frequency from a preset frequency memory to provide a frequency changeover signal to the radio receiver.

* * * * *

UNITED STATES PATENT AND TRADEMARK OFFICE
CERTIFICATE OF CORRECTION

PATENT NO. : 5,235,568

DATED : August 10, 1993

INVENTOR(S) : Noguchi Masaru

It is certified that error appears in the above-indentified patent and that said Letters Patent is hereby corrected as shown below:

On the title page, Abstract, line 5, change the semi-colon to a comma.

Column 2, line 19, change "an memory/call to --n memory/call--
line 55, change "combine" to --combined--

Column 5, lines 2-3, change "associated" to --associate--
line 15, after "selected", insert a period--
line 16, change "with" to --With--
line 45, change "disc" to --discs--
line 63, change "firs" to --first--

Signed and Sealed this

Twenty-fifth Day of October, 1994

Attest:

BRUCE LEHMAN

Attesting Officer     *Commissioner of Patents and Trademarks*